United States Patent den Hertog et al.

[11] 3,945,621
[45] Mar. 23, 1976

[54] EXTRUDER WITH HYDROSTATIC BEARING

[75] Inventors: Willem Cornelis den Hertog; Geert Rolleman, both of Hardenberg, Netherlands

[73] Assignee: Wavin B.V., Netherlands

[22] Filed: Feb. 15, 1974

[21] Appl. No.: 443,091

[30] Foreign Application Priority Data

Feb. 21, 1973 Netherlands .................... 7304238

[52] U.S. Cl. .............. 259/191; 308/9; 308/DIG. 4
[51] Int. Cl.² .......................................... B29B 1/06
[58] Field of Search ......... 259/191, 192, 193, 9, 10, 259/97, 25, 26, 45, 46; 100/145; 308/9, 187, DIG. 4, DIG. 5

[56] References Cited
UNITED STATES PATENTS

| | | | |
|---|---|---|---|
| 3,391,965 | 7/1968 | Lindeboom | 308/9 |
| 3,672,733 | 6/1972 | Arsenius | 308/9 |
| 3,700,247 | 10/1972 | Butler | 259/191 |
| 3,759,588 | 9/1973 | Anderson | 308/9 |

Primary Examiner—Robert W. Jenkins
Attorney, Agent, or Firm—Wilkinson, Mawhinney & Theibault

[57] ABSTRACT

Extruder, especially a multi-worm extruder with a housing and one or more mixing worms with associated shaft, as well as at least one hydrostatic bearing for absorbing the axial load of the conveying and mixing worm. A slit between a bearing disc on the worm shaft and a counter bearing ring can be filled with oil via a pipe connected to a pump, radial sealings preventing the oil from escaping between the gliding faces of the bearing, whereas the said counter bearing ring is rotatably supported in the extruder housing.

1 Claim, 1 Drawing Figure

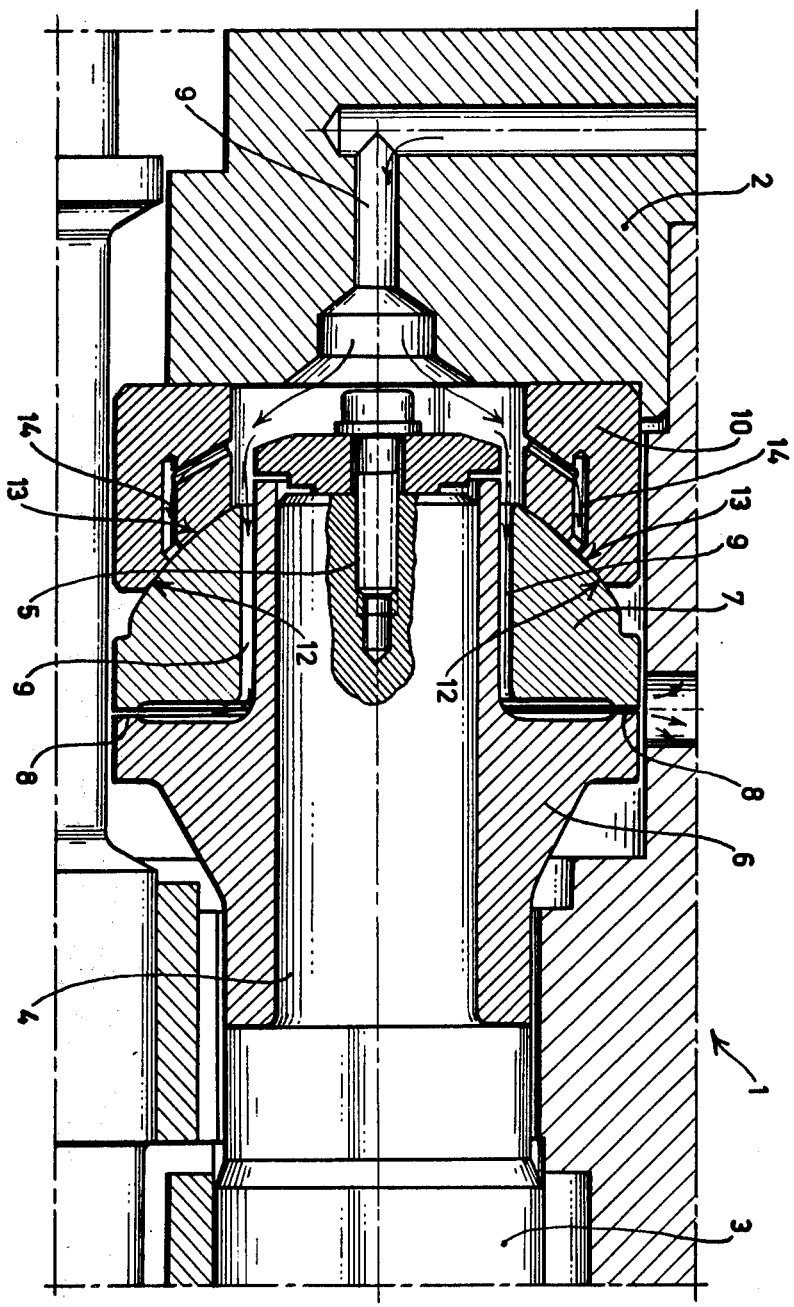

EXTRUDER WITH HYDROSTATIC BEARING

BACKGROUND OF THE INVENTION

The invention relates to an extruder, especially to a multi-worm extruder, comprising an extruder housing, one or more mixing worms with associated shaft and at least one hydrostatic bearing for absorbing the axial load of the conveying and mixing worm, while the slit between a bearing disc provided on the worm shaft and a counter bearing ring can be filled with oil via a pipe connected to a pump and radial sealings are provided, preventing the oil from escaping between the gliding faces of the bearing.

Such an extruder with a hydrostatic bearing is known per se. If this known extruder is axially loaded, an oil pressure is built up in the bearing slit, causing the bearing to be hydrostatically supported.

For obtaining a proper bearing, the slit between the bearing disc on the worm shaft and the counter bearing ring, is namely connected with an oil pump with a constant output. This pump pumps the oil towards the slit and as soon as the slit is filled with oil, the worm shaft will be slightly pressed forwards. At that moment the extruder can be switched in, since the sliding faces of the bearing disc and of the counter bearing ring do not longer contact. When the axial power of the worm increases, the slit becomes narrower whereby the oil velocity in the slit increases as well and the pressure becomes greater. A new balance is established then and the slit gets a new width.

Such a bearing shows many drawbacks.

When the oil pressure fails for instance, the oil pressure is discontinued owing to which the sliding faces of the bearing discs on the shaft of the mixing and conveying worm and of the counter bearing ring are pressed on each other rather soon with a great vigor. Consequently the two faces will "freeze", while damaging the counter bearing ring.

Another disadvantage is that when the oil pressure is suddenly discontinued, the synthetic material in the extruder is still at a high temperature, but is no longer mixed and conveyed. This results into decomposition of the synthetic material. This is attended with the formation of solid deposits in various parts, so that after the oil pressure pump has failed, one is mostly compelled to dismount the extruder entirely since presently it is impossible to remove the quantity of plastics, resting in the extruder housing, by further rotation of the mixing and conveying worm(s). Neither can this be done by hand since the sliding faces of the bearing disc on the shaft of the mixing and conveying worm and of the counter bearing ring have been "freezing".

One has tried to reduce damage to bearings in an extruder by using several hydrostatic bearings but nevertheless, the aforementioned difficulties could not be entirely obviated.

SUMMARY OF THE INVENTION

The invention aims to provide a multiworm extruder which does not suffer from the aforementioned disadvantages.

The invention aims especially to provide a multiworm extruder in which, when the oil pressure is discontinued, the surfaces of the bearing disc on the shaft of the mixing and conveying worm and of the counter bearing ring contact, whereby no "freezing" occurs, however.

Moreover, the invention aims to provide an extruder with such a bearing, that after the oil pressure has discontinued, the mixing and conveying worms can be caused to rotate for a sufficiently long time without disadvantageous results for the high temperature synthetic material in the extruder housing.

A special advantage is that in this way the synthetic material can always be pressed away and never changes into hard solid deposits which can easily give rise to injuries to the mixing and conveying worms, the extruder housing respectively.

Finally the invention aims to provide an extruder, particularly a multi-worm extruder with such a bearing that after repair of the oil pump the extruder can again be put into use without entirely dismounting the device.

This is achieved by the arrangement that the counter bearing ring is likewise rotatably supported in the extruder housing.

One accomplishes thus that after the oil pressure is discontinued the surfaces of the bearing disc on the shaft of the mixing worm and the counter bearing ring come to bear against each other, but that immediately thereupon the whole can rotate further, due to rotation of the counter bearing ring which is likewise rotatably supported in the extruder housing.

With special advantage the at least partially spherical surface of the counter bearing ring, which surface lies opposite that of the counter bearing ring, situated directly in front of the bearing disc, is rested in a cup-shaped space which is at least partially adapted thereto.

The counter bearing ring can thus freely rotate in this cup which results in that, when the oil pressure is discontinued the worm shaft with the counter bearing ring can continue rotating.

Another advantage of this embodiment is that, when the worm shaft moves, the counter bearing ring part can follow each movement, so that the ground faces of the counter pressure ring and the bearing disc on the shaft of the mixing worm never damage each other.

So as to prevent the spherical surface from "freezing", the surface of the cup-shaped space the cup is made of bronze, whereas the counter bearing ring is manufactured from steel.

The surfaces of the counter bearing ring and the bearing disc on the shaft of the mixing worm which can cooperate with each other, are both steel made. One has chosen two ground steel faces in order to keep any damage, should the axial force still exist when the oil pressure is discontinued, as small as possible. The ground steel faces will then press on each other, while the surface is selected in such a way that the permissible surface pressure is not exceeded.

Movements, if any, of the worm will be entirely followed by the counter bearing ring when the same is moving in the bronze cup. The friction coefficient of steel on steel is namely higher than that or bronze on steel, so that the extruder shaft can continue to rotate.

By means of the aforementioned bearing in a single or multiworm extruder a very good extruder protection is obtained while the risks of injuries to the device are limited to a minimum.

The drawing shows a bearing in outline.

DESCRIPTION OF A PREFERRED EMBODIMENT

In the drawing part of an extruder is shown comprising an extruder housing and several mixing and conveying worms 3 one of which is depicted.

The mixing and conveying worm is provided with a shaft 4 which, via a connection 5 can be connected with a motor drive.

The shaft 4 of the relative worm carries a standing ring 6 constituting the bearing disc. Opposite the surface of the bearing disc 6 is situated the surface of the steel counter bearing ring 7. The slit 8 between the surface of bearing disc 6 and counter bearing ring 7 is connected to an oil pipe 9, which is connected with a hydraulic oil pump with a constant output. By means of this pump the slit 8 between bearing disc 6 and counter bearing disc 7 can be filled with oil, whereby in dependence of the axial load taken by the shaft, a more or less wide slit 8 is formed.

When the oil pressure is discontinued, the surfaces of the bearing disc and the counter bearing ring will be directly pressed against each other in such an extruder, so that they could amalgamate. Consequently, the mixing and conveying worms stop. This happens mostly when there is still a considerable quantity of synthetic material in the extruder.

In order to avoid superheating or combustion of synthetic material the counter bearing ring 7 is at its other spherical end 12 rotatably supported in a stationary cup-shaped piece 10 with a cup-shaped surface 13. The slit between the surfaces 12 and 13 is lubricated by oil supplied via lubricating apertures 14 this oil being under the same pressure as the oil in the slit 8.

Due to the fact that the counter bearing ring 7 is rotatably supported, this ring can glide with respect to the cup-shaped surface 13. When too intense a friction is produced hereby between the counter bearing ring 7 and the bearing disc 6 on shaft 4 of the conveying worm, the counter bearing ring 7 will be capable of rotation with respect to the stationary cup-shaped part 10.

The extruders are thus well protected, the more so since the supply of synthetic material can be immediately stopped when the oil pressure is discontinued.

The bearing ring 7 can moreover adjust itself in a desired position by rotation.

What we claim is:

1. An extruder especially a multi-worm extruder comprising an extruder housing having at least one mixing worm with associated shaft and at least one hydrostatic bearing for absorbing the axial load of the conveying and mixing worm, a bearing disc on the worm shaft, a counter bearing defining a slit on one end and having a partially spherical surface on its other end, means supplying said slit with oil, said counter bearing ring being rotatably supported in a partially spherical recess in said extruder housing, and said partially spherical surface of the counter bearing resting in said partially spherical recess in said extruder housing.

* * * * *